United States Patent Office 3,598,641
Patented Aug. 10, 1971

3,598,641
PROCESS FOR IMPROVING THE OIL RELEASE AND ANTI-STATIC PROPERTIES OF A TEXTILE AND THE RESULTING PRODUCT
Harry A. Miller, Harold L. Jackson, Harry M. Johnson, and Charles W. Canter, Altavista, Va., assignors to Klopman Mills, Inc., Rockleigh, N.J.
No Drawing. Filed Nov. 29, 1968, Ser. No. 780,220
Int. Cl. B32b 27/08, 27/12
U.S. Cl. 117—138.8E
7 Claims

ABSTRACT OF THE DISCLOSURE

A process for improving the oil release and anti-static properties of a textile or other material normally subject to troublesome oil staining and static pickup which comprises treating said material with an aqueous solution of a copolymer of methacrylic acid and dimethylaminoethyl methacrylate, drying and curing.

The present invention relates to a process for improving the anti-static and oil release properties of textiles and other materials which are normally subject to oil staining and static pickup.

The invention contemplates the provision of a durable finish for the textile or other material which will withstand repeated laundering while providing the treated material with highly effective anti-static and oil release properties. The finish of the invention is useful in providing oil (or soil) release in conection with so-called durable press fabrics of the post- or pre-cured type, e.g., fabrics composed of cellulosic or polyester fibers or blends thereof, which are very susceptible to oily stains that are difficult to remove due to the durable press resin employed and/or the nature of the fibers involved. The present oil release finish may be applied simultaneously with the durable press materials (e.g., aminoplast resin and catalyst) or in a separate pre- or post-treatment. The invention is not, however, limited to the treatment of durable press goods and is contemplated for use with any type of textile, plastic or other material which is hydrophobic and/or otherwise normally suffers from static pickup and severe soiling which is difficult to remove in laundering.

According to the invention, the desired anti-static and oil release finish is obtained by applying to the textile or other material to be treated an aqueous solution of a copolymer of methacrylic acid and dimethylaminoethyl methacrylate, followed by drying and curing. The copolymer may be prepared in conventional fashion by copolymerizing the acid and methacrylate component in aqueous medium at appropriate temperature (e.g., 120–150° F. in the presence of a catalyst such as benzoyl peroxide or the like). The ratio of methacrylic acid to dimethylaminoethyl methacrylate can be varied but usually the copolymer will contain from 10–90% by weight of the acid and from 90–10% by weight of the co-monomer, e.g., 70/30, 60/40, 50/50, and 35/65 monomer ratios are typical. Usually the best results are obtained as the mole ratio of methacrylic acid to dimethylaminoethyl methacrylate is increased above 1:1 e.g., from 2:1 to 4:1, although effective results are obtained at lower ratios within the limits indicated above. It is important to use a solution rather than dispersions or emulsions of the copolymer and in the circumstances, the polymerization should be controlled to give a molecular weight low enough to maintain water-solubiilty of the copolymer. Usually the viscosity of the copolymer will fall in the range of 10 to 5000 centipoises, although values outside this range may also be used.

Normally in the case of textiles such as 100% cotton fabric, 100% polyester fabric or cotton/polyester blends, the treatment is carried out by impregnating the fabric (as by padding or spraying) with an aqueous solution containing from 1–25% by weight of the copolymer, followed by drying at 175–200° F. for 1–5 minutes and curing at 275–380° F. for ½–15 minutes although it will be recognized that concentrations, drying and/or curing conditions can be varied depending upon the circumstances, e.g., the nature and construction of the fabric. Usually wet pick-up will be in the neighborhood of 50–70% by weight, based on the original fabric weight, and the copolymer solids add-on (dry) will normally be between about 0.5–10% based on the original fabric weight. The fabric, after curing, demonstrates excellent anti-static and oil release properties even after repeated launderings.

Without intending to be limited to any specific explanation, it appears that the copolymer used herein confers the desired properties onto the fabric which is treated by fixation of the copolymer to the fabric during curing, the thus attached copolymer being sufficiently moisture- and alkali-sensitive to swell when the fabric is washed with water and thus release oil stains which would normally be retained. The moisture sensitivity of the copolymer apparently also permits ionic movement which rapidly carries off electrical charges thus rendering the fabric anti-static. In this regard the carboxyl groups and the amino groups make the copolymer polyampholytic so that it rapidly dissipates both positive and negative charges of electricity.

Despite the apparent water sensitivity of the copolymer, the present finish is remarkably durable to laundering. This is evidenced by the fact that a high oil or soil release rating is obtained even after repeated laundering of the fabric (e.g., after ten or twenty launderings).

While the invention is of particular importance in connection with the treatment of fabrics composed of cellulosic and/or polyester fibers, especially fabrics which include durable press type of resin applied before, with or after the present finish, the invention may also be used in the treatment of fabrics made up entirely or in part of other synthetic fibers, e.g., nylon, acrylics, rayon, etc. Plastics such as polypropylene and polyethylene in film, fiber or sheet form may also be treated according to the invention.

The invention is illustrated, but not limited, by the following examples wherein parts and percentages are by weight.

EXAMPLE 1

A woven fabric comprising 35% cotton, 65% polyester fibers was padded with a 10% aqueous solution of a 60/40 copolymer of methacrylic acid and dimethylamino ethyl methacrylate (pH about 7, viscosity about 700 centipoises) with 75% wet pick-up. The fabric was then dried at 200° F. for two minutes (5–7% moisture) and then cured by heating at 320° F. for 15 minutes.

Pieces of the thus treated fabric were then soiled before any laundering with the following oily substances: black oil, mineral oil and motor oil. Other pieces of the fabric were first laundered nine times and soiled as above. After soiling, all of the fabric pieces were laundered once and then visually examined for soil release. All of the pieces were given a soil release rating of 5 indicating no visible staining even for the fabric specimens that had been laundered ten times. This shows the durability of the finish.

Test for anti-static properties (e.g., AATCC Test Method–76–1964—Electrical Resistivity of Fabrics) also showed substantial improvement for the treated goods over the untreated fabric. The hand and other properties of the treated fabric were satisfactory. There was no discoloration of the fabric such as might normally be expected from the use of an amino compound subjected to heating.

The copolymer composition used above was prepared by heating 60 parts methacrylic acid and 40 parts dimethylaminoethyl methacrylate in aqueous solution at 122° F. for 6-90 minutes using benzoyl peroxide as catalyst.

EXAMPLE 2

Example 1 was repeated using a fabric composed entirely of polyester fibers with similar improvement in oil release and anti-static properties.

EXAMPLE 3

Example 1 was repeated except that the pad composition included 20% reactant 183 (dimethylol dihydroxy cyclic ethylene urea) and 1% zinc nitrate as catalyst. A durable press fabric was obtained which demonstrated excellent oil release properties even after ten launderings.

EXAMPLE 4

A sheet of polypropylene was coated with the formulation of Example 1, dried and cured as indicated therein. When tested for anti-static properties, the sheet demonstrated substantial improvement over a similar untreated polypropylene sheet.

It will be appreciated that various modifications may be made in the invention described herein. For example, other copolymers containing the balance of carboxyl and amino groups of the copolymer used in the above examples may be advantageously used. Other modifications may also be made in the invention as defined in the following claims, wherein:

We claim:
1. A process for improving the oil release and anti-static properties of a textile or other material normally subject to troublesome oil staining and static pick-up which comprises treating said material with an aqueous solution of a water-soluble copolymer of methacrylic acid and dimethylaminoethyl methacrylate, wherein the mole ratio of methacrylic acid to methacrylate is in the range of 1:1 to 4:1, as the essential oil release and anti-static agent, drying and curing.

2. The process of claim 1 wherein said material is a textile fabric.

3. The process of claim 2 wherein said fabric comprises cellulosic fibers.

4. The process of claim 2 wherein said fabric comprises polyester fibers.

5. The process of claim 1 wherein said material is a polyolefin.

6. The process of claim 1 wherein said solution includes a durable press resin.

7. A textile product of improved oil release and anti-static properties comprising a textile selected from the group consisting of cellulosics, polyester and other synthetics normally subject to oil staining and static pick-up, coated with a cured copolymer of methacrylic acid and dimethylamino ethyl methacrylate wherein the mole ratio of methacrylic acid to methacrylate is in the range of 1:1 to 4:1, as the essential oil release and anti-static agent, said copolymer being applied to the textile in water-soluble aqueous solution form.

References Cited

UNITED STATES PATENTS

| | | | |
|---|---|---|---|
| 3,078,185 | 2/1963 | Kine et al. | 117—143X |
| 3,399,159 | 8/1968 | Samour | 260—29.6 |
| 3,425,863 | 2/1969 | Honig et al. | 117—139.5 |

WILLIAM D. MARTIN, Primary Examiner

T. G. DAVIS, Assistant Examiner

U.S. Cl. X.R.

117—138.8F, 139.4, 139.5A, 143A